(12) United States Patent
James Namboorikandathil Joseph et al.

(10) Patent No.: US 9,946,609 B2
(45) Date of Patent: Apr. 17, 2018

(54) MANAGING MULTI-LEVEL BACKUPS INTO THE CLOUD

(71) Applicant: NetApp, Inc., Sunnyvale, CA (US)

(72) Inventors: James Namboorikandathil Joseph, Bangalore (IN); John Keith Fullbright, Evans, GA (US); Vijay Srinath, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 357 days.

(21) Appl. No.: 14/719,646

(22) Filed: May 22, 2015

(65) Prior Publication Data

US 2016/0239388 A1    Aug. 18, 2016

(51) Int. Cl.
*G06F 17/30*    (2006.01)
*G06F 11/14*    (2006.01)

(52) U.S. Cl.
CPC ...... *G06F 11/1464* (2013.01); *G06F 11/1458* (2013.01); *G06F 11/1469* (2013.01); *G06F 11/1451* (2013.01)

(58) Field of Classification Search
None
See application file for complete search history.

(56) References Cited

U.S. PATENT DOCUMENTS

| | | | |
|---|---|---|---|
| 6,327,584 B1 * | 12/2001 | Xian | G06F 17/3023 |
| 2005/0262377 A1 * | 11/2005 | Sim-Tang | G06F 11/2069 714/1 |
| 2007/0100913 A1 * | 5/2007 | Sumner | G06F 11/1453 |

* cited by examiner

*Primary Examiner* — Anh Tai Tran
(74) *Attorney, Agent, or Firm* — Gilliam IP PLLC

(57) ABSTRACT

A backup tool can manage multi-level backup into a cloud and restoration from the cloud. The backup tool can request a data source to stream backup data to the backup tool, and the backup tool can then generate data objects from the data stream for storing into the cloud. The backup tool generates the data objects in accordance with serialization of the data stream. The order of the data objects resulting from the data stream serialization is encoded into the names of the data objects. In addition, the backup tool encodes the backup level into the object names. With sequencing and backup level encoded into the data object names, the data objects can be stored in the cloud for later restoration.

20 Claims, 6 Drawing Sheets

MANAGING MULTI-LEVEL BACKUPS INTO THE CLOUD

BACKGROUND

Embodiments of the disclosure generally relate to the field of data processing, and, more particularly, to data backup.

Backup and archival solutions increasingly rely on cloud service providers. A cloud service provider maintains equipment and software without burdening customers with the details. The cloud service provider provides an application programming interface (API) to customers. The API provides access to resources of the cloud service provider without visibility of those resources.

Since the backup and archival solutions traverse a network, solutions often employ multiple levels of backup. At a level 0, a backup solution creates a baseline backup image. Subsequent levels correspond to incremental backups that capture changes from the preceding level of backup.

SUMMARY

A backup tool can manage multi-level backup into a cloud and restoration from the cloud. The backup tool can request a data source to stream backup data to the backup tool, and the backup tool can then generate data objects from the data stream for storing into the cloud. The backup tool generates the data objects in accordance with serialization of the data stream. The order of the data objects resulting from the data stream serialization is encoded into the names of the data objects. In addition, the backup tool encodes the backup level into the object names. With sequencing and backup level encoded into the data object names, the data objects can be stored in the cloud for later restoration.

This summary is a brief summary for the disclosure, and not a comprehensive summary. The purpose of this brief summary is to provide a compact explanation as a preview to the disclosure. This brief summary does not capture the entire disclosure or all embodiments, and should not be used limit claim scope.

BRIEF DESCRIPTION OF THE DRAWINGS

The embodiments may be better understood by referencing the accompanying drawings.

DESCRIPTION OF EMBODIMENT(S)

Figure 1:
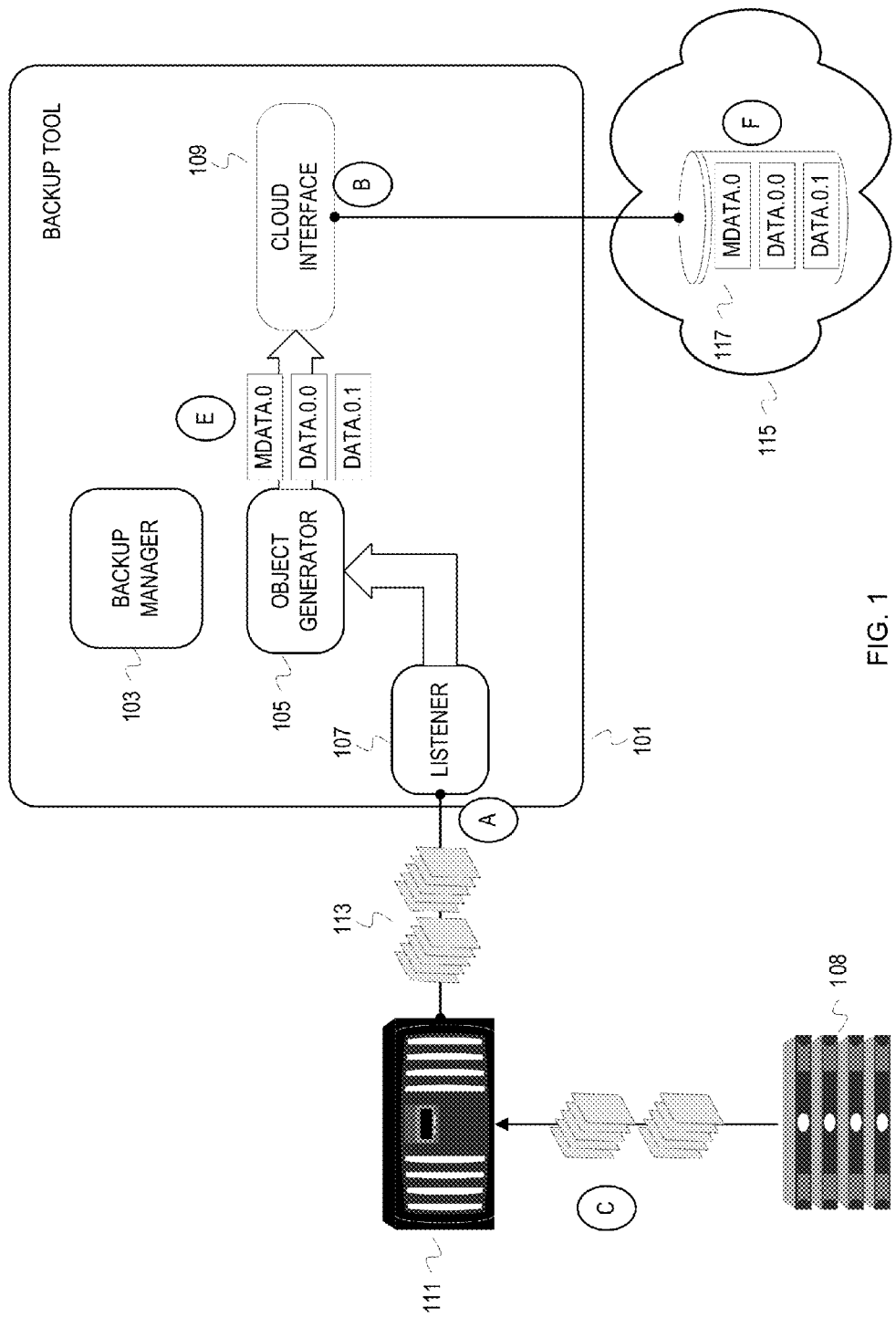
FIG. 1 depicts a conceptual diagram of a backup tool managing backup between a storage source and a cloud destination.

The description that follows includes example systems, methods, techniques, machine instructions/program code that embody techniques of the disclosed subject matter. However, it is understood that the described embodiments may be practiced without these specific details. For instance, although examples refer to NDMPcopy, that particular backup tool is not necessary for embodiments. In other instances, well-known instruction instances, protocols, structures and techniques have not been shown in detail in order not to obfuscate the description.

TERMINOLOGY

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. The term "cloud destination" and "cloud source" refer to an entity that has a network address that can be used as an endpoint for a network connection. The entity may be a physical device (e.g., a server) or may be a virtual entity (e.g., virtual server or virtual storage device). In more general terms, a cloud service provider resource accessible to customers is a resource owned/manage by the cloud service provider entity that is accessible via network connections. Often, the access is in accordance with an application programming interface or software development kit provided by the cloud service provider.

This description uses the term "data stream" to refer to a unidirectional stream of data flowing over a data connection between two entities in a session. The entities in the session may be interfaces, services, etc. The elements of the data stream will vary in size and formatting depending upon the entities communicating with the session. Although the data stream elements will be segmented/divided according to the protocol supporting the session, the entities may be handling the data at an operating system perspective and the data stream elements may be data blocks from that operating system perspective. The data stream is a "stream" because a data set (e.g., a volume or directory) is serialized at the source for streaming to a destination. Serialization of the data stream elements allows for reconstruction of the data set. The data stream is characterized as "flowing" over a data connection because the data stream elements are continuously transmitted from the source until completion or an interruption. The data connection over which the data stream flows is a logical construct that represents the endpoints that define the data connection. The endpoints can be represented with logical data structures that can be referred to as interfaces. A session is an abstraction of one or more connections. A session may be, for example, a data connection and a management connection. A management connection is a connection that carries management messages for changing state of services associated with the session.

This description uses the term "backup image" to refer to a file(s) that at least contains or references data and information about structural organization of the data. A backup image can have additional data/information. For instance, a backup image may also have a copy of an operating system and system state (e.g., a virtual machine backup image, a filesystem backup image, etc.). A backup image can also have additional information for restoring the data in accordance with the structural organization (e.g., indication of a compression scheme).

This description also refers to a "restore engine." The term restore engine refers to a software component or program that receives a backup image and recreates a data set (e.g., file directory, volume, etc.) from the backup image.

INTRODUCTION

The network data management protocol (NDMP) is an open protocol for data management intended to allow a network backup application to control backup and retrieval at an enterprise level with network level interoperability and without third party software. NDMPcopy can be considered a backup tool within the NDMP framework. NDMPcopy transfers data in accordance with NDMP. NDMPcopy manages a data transfer directly between a source device and a destination device. A supporting network will not be burdened carrying data among three entities: 1) the source device, 2) the destination device, and 3) a host of the process(es) instantiated for NDMPcopy ("NDMPcopy host"). The supporting network will carry the data between the devices directly and management messages to the NDMPcopy host. This direct transfer does not account for data transfers to a cloud destination.

Overview

A backup tool can manage multi-level backup into a cloud and restoration from the cloud. The backup tool can request a data source to stream backup data to the backup tool, and the backup tool can then generate data objects from the data stream for storing into the cloud. The backup tool generates the data objects in accordance with serialization of the data stream. The order of the data objects resulting from the data stream serialization is encoded into the names of the data objects. In addition, the backup tool encodes the backup level into the object names. With sequencing and backup level encoded into the data object names, the data objects can be stored in the cloud for later restoration.

Example Illustrations

FIG. 1 depicts a conceptual diagram of a backup tool managing backup between a storage source and a cloud destination. In FIG. 1, a backup tool 101 handles backup of a data set from a storage controller 111 to a destination in a cloud 115. The backup tool 101 includes a backup manager 103. The storage controller 111 manages storage media 108. The storage media can be any storage device connected either directly to the storage controller 111 or via a network. Examples of the storage media 108 include an array of disk drives, an array of solid state drives, and a direct attached storage device. FIG. 1 uses alphabetical notations for a series of example operations. The alphabetical sequence A-F is an example to aid in understanding the description and not to be used to limit claim scope. The sequence of operations are performed in response to the backup tool 101 being invoked to backup a data set from the storage media 108 to a destination in the cloud 115. The backup is for a baseline or level 0 backup.

At a stage A, a backup manager 103 establishes a connection with the storage controller 111. To establish the connection, the backup manager 103 instantiates a listener process 107. The backup manager 103 communicates a connection endpoint identifier (e.g., network address of a host of the backup tool 101 and a logical socket) to the storage controller 111. Various services may also be spawned on either end of the established connection. The listener process 107 monitors the identified endpoint for receipt of data.

At a stage B, the backup manager 103 establishes a connection with the cloud destination. Since the destination can be any machine or virtual machine associated with a network address, FIG. 1 merely depicts the cloud 115. The backup manager 103 established the connection using a cloud interface 109, which can be an application programming interface published by a cloud service provider that owns and/or manages the cloud 115.

At stage C, the backup manager 103 causes the storage controller 111 to begin streaming the data set from the storage media 108 to the connection endpoint associated with the backup tool 101. The backup manager 103 sends a message to the storage controller 111 that requests the storage controller 111 to start streaming the data set to the previously communicated endpoint over the established connection. The storage controller 111 begins reading the data set (e.g., in data blocks or files) from the storage media 108. The storage controller transmits a data stream 113 to the backup tool 101 endpoint.

At stage D, the listener 107 detects receipt of elements of the data stream 113. After detecting receipt, the listener 107 passes received elements of the data stream to an object generator 105 of the backup tool 101. The listener 107 can pass each data stream element or groups of data stream elements. Passing the data stream element scan involve copying or moving the data stream elements to a buffer or queue associated with the object generator 105 (e.g., reserved memory space). Passing can also be referential passing (e.g., pointer and length).

At stage E, the object generator 105 generates objects based on an indicated object size and serialization of the data stream 114. The indicated object size can be a predefined size for each data object. This can be defined based on any one of a cloud services agreement, backup tool host capability, available bandwidth, etc. The object generator 105 generates a metadata object for the backup operation. Since the data stream is serialized, the object generator 105 generates the data objects in accordance with the order of the data stream elements. FIG. 1 depicts the object generator 105 generating three objects: 1) metadata object MDATA.0, 2) DATA.0.0, and 3) DATA.0.1. The backup manager 103 encodes the metadata object as MDATA.0 to identify the object as containing metadata for a level 0 backup. The backup manager 103 encodes a data object as DATA.0.0 to identify the object as a first segment (i.e., segment 0) of a data stream or as a first data object of a data set. The backup manager 103 encodes a data object as DATA.0.1 to identify the object as a second segment or as a second data object of a data set. The backup manager 103 also determines an identifier for the set of objects generated from the backup data stream.

At stage F, the backup tool supplies the objects for storing into the cloud 115 via a cloud interface 109. The backup tool 109 stores the generated objects into a data container 117 of the cloud 115. The backup tool 109 identifies the data container 117 with the object set identifier that was determined by the backup manager 103.

Figure 2:
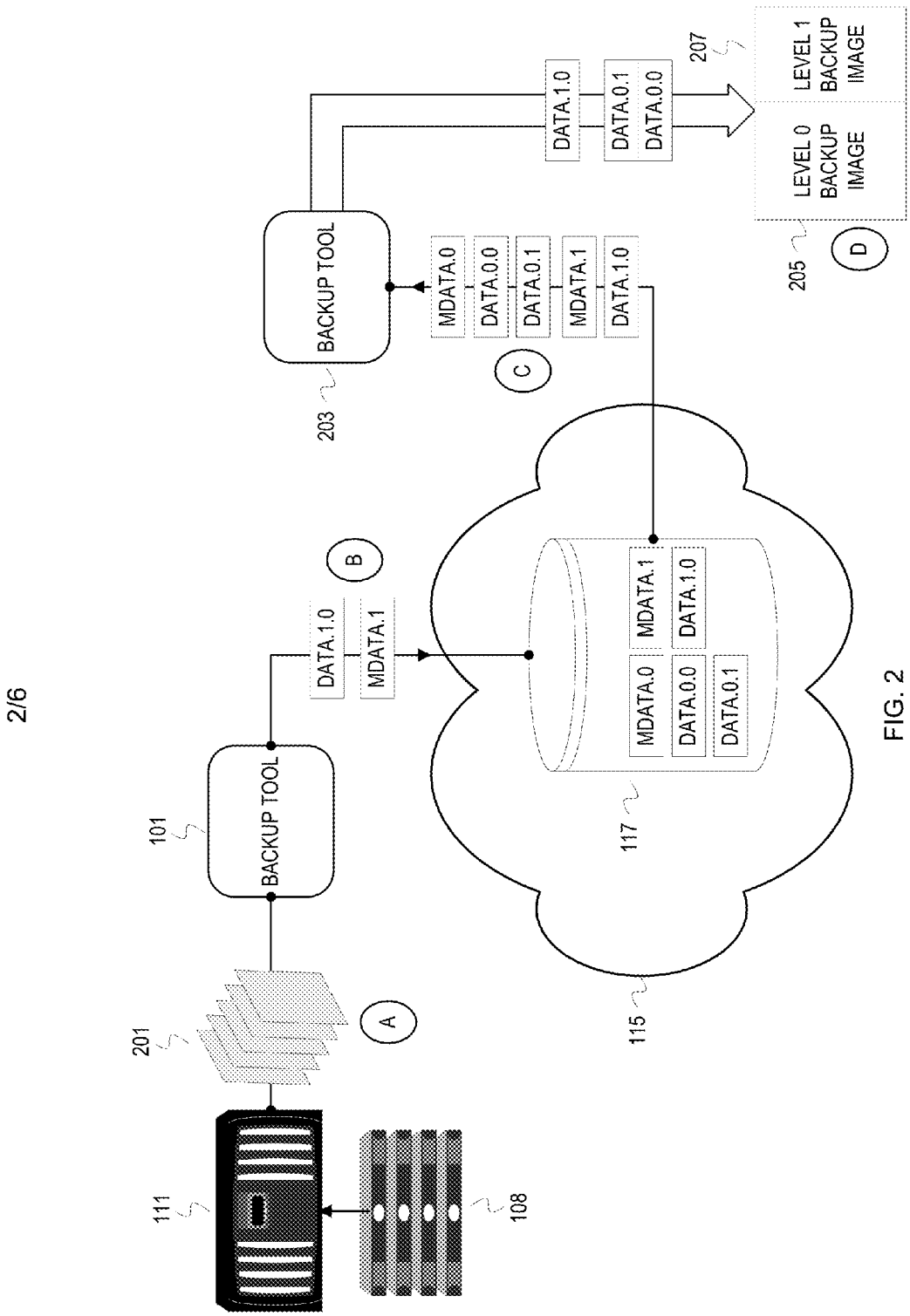
FIG. 2 depicts a conceptual diagram of example backup tools performing an incremental backup to the cloud and restoring a data set from cloud objects.

After a data set is backed up to a cloud as objects, the data set is likely restored from the objects at some later point in time. FIG. 2 depicts a conceptual diagram of example backup tools performing an incremental backup to the cloud and restoring a data set from cloud objects. As with FIG. 1, the alphabetical sequence A-D is an example to aid in understanding the description and not to be used to limit claim scope. The sequence of operations are performed in response to the backup tool 101 being used to perform an incremental backup of the data set backed up in FIG. 1, and a backup tool 203 being used to restore the data set from the objects in the cloud 115.

At a stage A, the storage controller 111 streams a backup data stream 201 for an incremental backup of the data set on the storage media 108. The storage controller 111 streams the backup data stream 201 to the backup tool 101.

At a stage B, the backup tool 101 transmits a metadata object and a data object to the cloud 115. The backup tool 101 generates and names the data object DATA.1.0 and the metadata object MDATA.1 in a similar manner as described in FIG. 1. Since this is an incremental backup after the baseline backup, the names of the objects indicate a backup level 1. The backup tool 101 writes these objects into the data container 117.

At a stage C, the backup tool 203 is requested to restore the data set that was backed up into the cloud. The backup tool 203 establishes a connection with a source in the cloud 115, which was the cloud destination in FIG. 1, and retrieves the objects in the data container 117.

At a stage D, the backup tool 203 constructs backup images based on the retrieved objects. The backup tool 203 constructs a level 0 backup image from the level 0 data objects. The backup tool 203 uses the level 0 metadata object to ensure all of the data objects for backup level 0 have been retrieved. The backup tool 203 constructs a level 1 backup image from the level 1 data object. The backup tool 203 uses the level 1 metadata object to ensure all of the level 1 data objects have been retrieved. After constructing the backup images, the backup tool 203 can pass the backup images to a restore engine. Although the metadata objects are initially used by the backup tool 203 for inventor purposes, the backup tool 203 may also pass the metadata objects to the restore engine if the metadata indicate additional information for recreation/extraction of the data set (e.g., encryption information, compression information, etc.).

Figure 3:
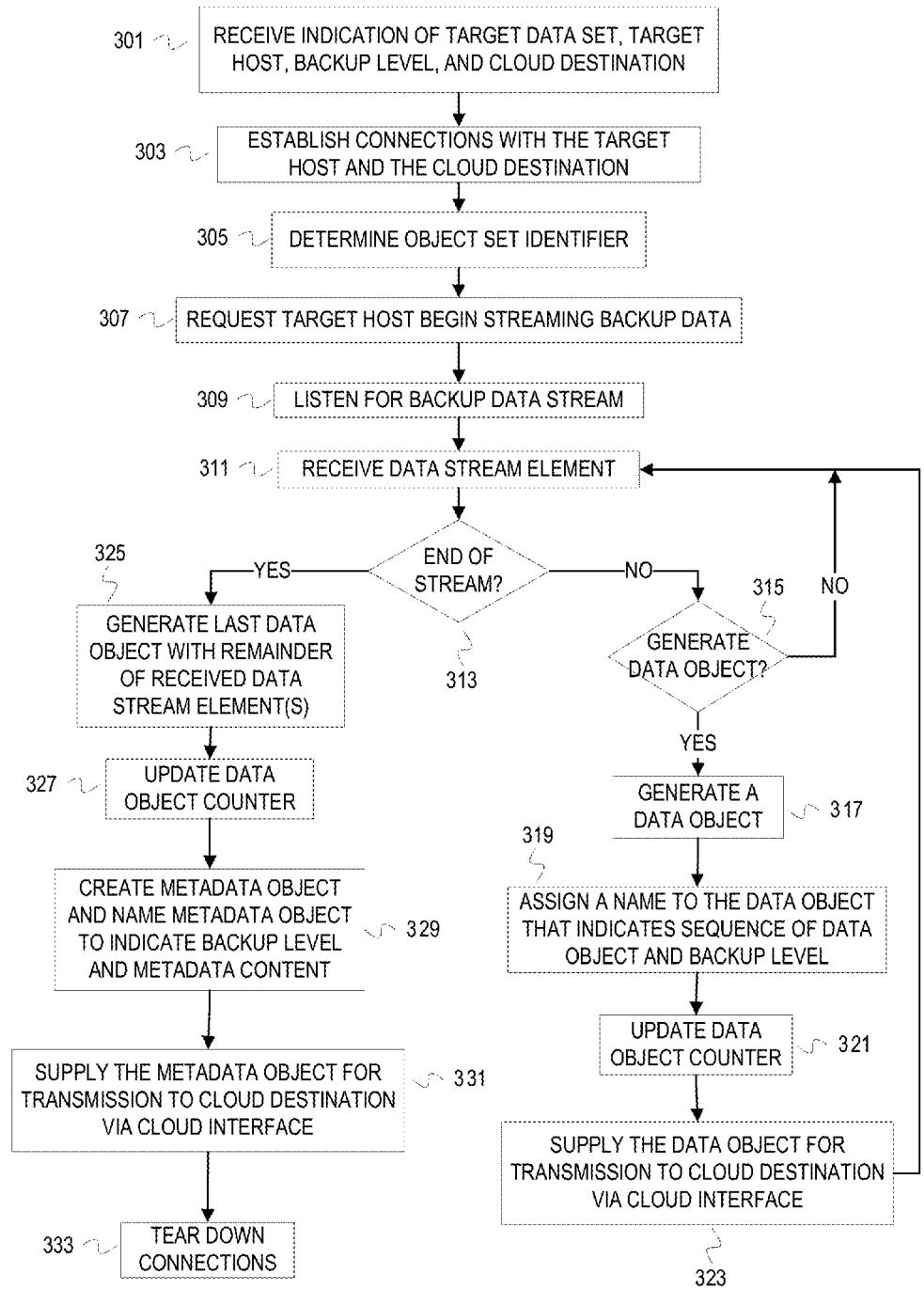
FIG. 3 depicts a flowchart of example operations for managing multiple level backup into a cloud.
Figure 4:
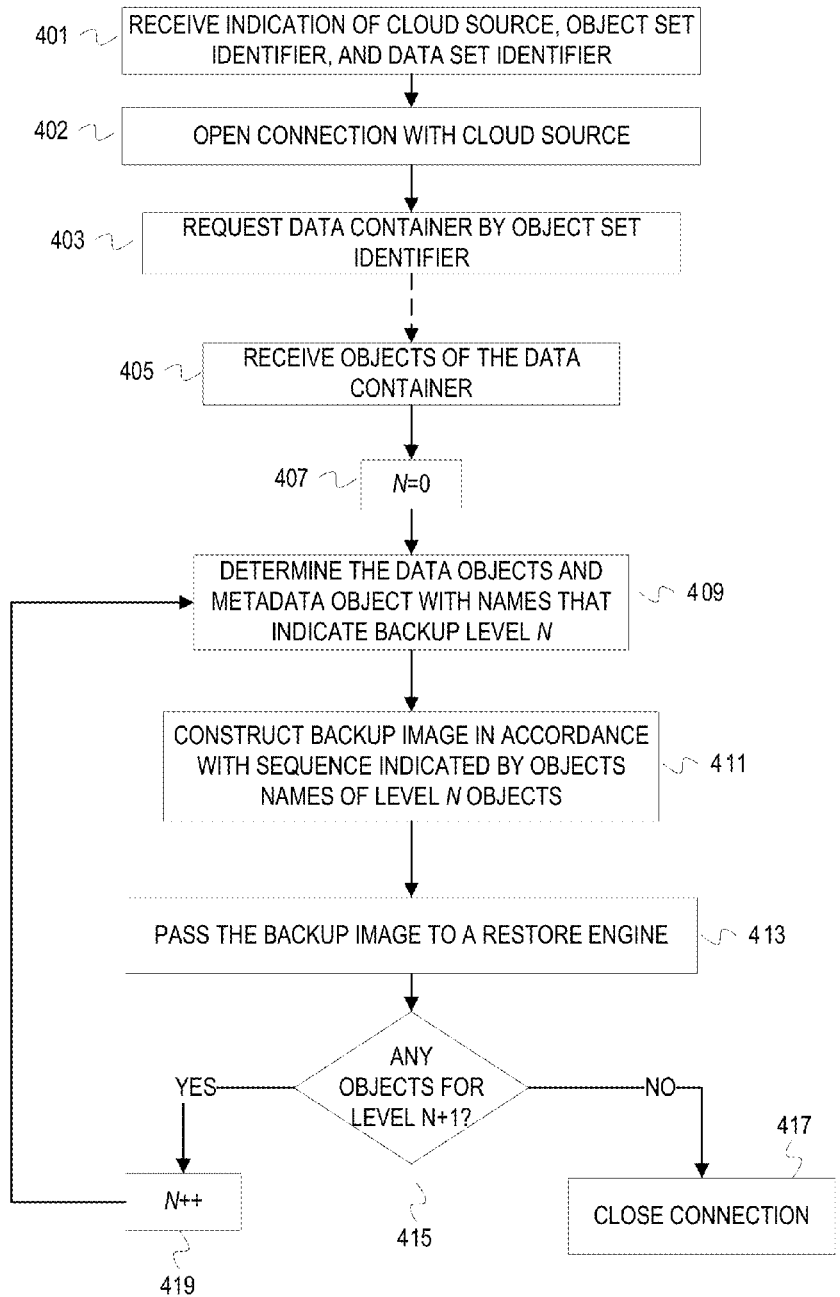
FIG. 4 depicts a flowchart of example operations for obtaining a cloud data container that contains objects of an object set and constructing a backup image from those objects.
Figure 5:
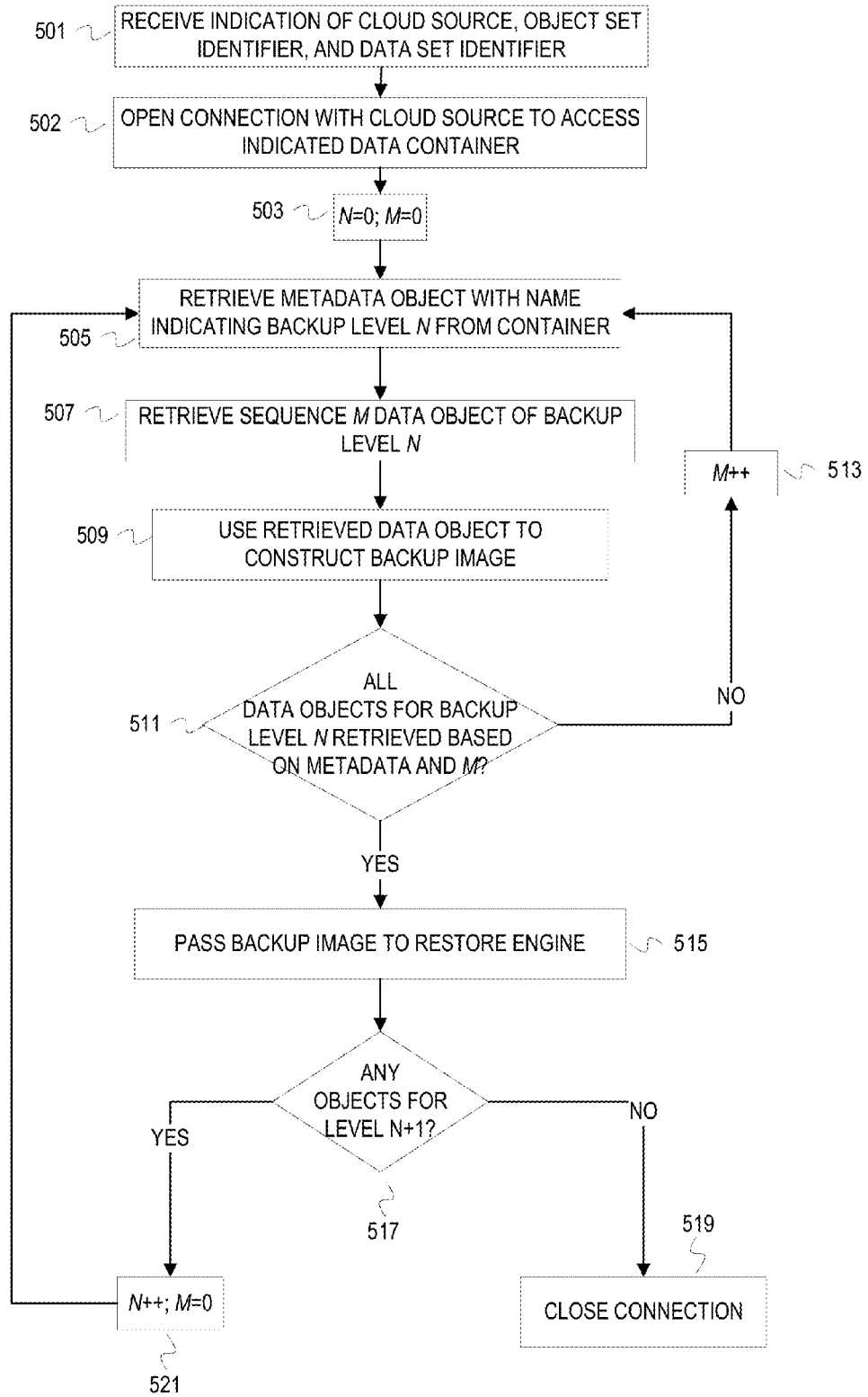
FIG. 5 depicts a flowchart of example operations for retrieving data objects from a cloud data container in accordance with sequential information encoded in the object names.

FIG. 3 depicts a flowchart of example operations for managing multiple level backup into a cloud. FIGS. 3-5 will refer to a backup tool as performing the operations for consistency with FIGS. 1-2. But machine instructions or program code can have any name (e.g., transfer tool, migration tool, etc.), be organized in different ways (e.g., be a component of another program), etc.

At block 301, a backup tool receives indication of a target data set, a target host, a backup level, and a cloud destination. This information can be entered by a user, read from a file, determined by another program, etc. Further, not all of this information requires explicit indication. For instance, the backup tool can maintain a history of backup operations and determine the backup level based on a last backup operation performed for the target data set. The target data set can be any of a volume, set of volumes, a file system, a set of qtrees, a directory, a subdirectory, etc. The target data set can be identified by name, path, etc. Often the target data set is a large data set. The meaning of large varies over time, but an example would be at least a few gigabytes in size. The data host and cloud destination can be indicated with names that resolve to respective network addresses, can be identified with the network addresses and port numbers, etc.

At block 303, the backup tool establishes connections with the target host and the cloud destination. In the case of an NDMP compliant backup tool, the backup tool would establish a control connection with the target host and then a data connection. In addition, the backup tool would maintain an NDMP state machine in accordance with control messages exchanged over the control connection. Both connections can be transfer control protocol/internet protocol (TCP/IP) based connections.

At block 305, the backup tool determines an object set identifier. The object set identifier can be explicitly indicated along with the backup command in block 301. The backup tool can generate the backup set identifier based, at least in part, on the identity of the target data set.

At block 307, the backup tool requests that the target host begin streaming the target data set. For example, the backup tool sends a request message over a control connection to the target host. As part of establishing the connections, the backup tool would have provided to the target host an identifier for a connection endpoint associated with the backup tool. The target host will start reading units of the data set (e.g., blocks, files, chunks, etc.) from the storage medium or media hosting the data set and streaming the data set units to the identified connection endpoint. Of course, the data set units will be manipulated in accordance with the communication protocol supporting the data connection. But the backup tool will have the perception of receiving the data set units read by the target host.

At block 309, the backup tool listens for the backup stream from the target host. After sending the request to the target host, the backup tool launches a daemon, thread, or process that monitors or polls a memory location (e.g., buffer, queue, etc.) for receipt of elements of the data stream.

At block 311, the backup tool receives a data stream element. The launched process (i.e., listener) detects receipt of at last a first element of the data stream. The listener can notify a managing process of the detected receipt. The listener can communicate data stream elements, literally or referentially, to another process that creates objects for cloud storage.

At block 313, the backup tool determines whether the received data stream element indicates an end of stream marker. If the received data stream element indicates an end of stream marker (or includes an end of stream marker), then control flows to block 325. If the received data stream element does not indicate the end of stream marker, then control flows to block 315.

At block 315, the backup tool determines whether a data object should be generated. A maximum data size is defined for a data object. When data from the data stream are sufficient to satisfy the data size is received, the backup tool generates a data object. To illustrate, a volume being backed may be 500 gigabytes (GB). If a data stream element is 4 kilobytes (KB) and the defined maximum data object size is 2 GB, then the backup tool will generate a data object every 524,288 data stream elements. The backup tool can determine that a data object should be generated based on counting the number of data stream elements queued for generation of a data object. As another example, the backup tool can determine that the data object should be generated in response to detecting a queue(s) corresponding to object size is full. If a data object should not be generated, then control flows to back to block 311. If a data objects is to be generated, then control flows to block 317.

At block 317, the backup tool generates a data object. The backup tool can insert data stream elements into a queue(s) of a size that corresponds to the object size. The data stream elements are inserted in accordance with their serialization. To generate the data object, the backup tool wraps the constituent data stream elements with delimiters indicating the beginning and end of the content of the data objects and creates bookkeeping data (i.e., metadata) for the data object (e.g., actual size of the data object).

At block 319, the backup tool assigns a name to the data object. The name is in accordance with a predefined naming scheme that reflects the multiple levels of backup and serialization of the data stream. To capture the serialization of the data stream, the name will encode a sequence of the data objects that conforms to the serialization of the data stream. Unless done prior to actual creation of the data object, the backup tool updates metadata of the data object to indicate the name of the data object.

At block 321, the backup tool updates a data object counter. The backup tool tracks the number of data objects created for a backup session for later recording into a metadata object.

At block 323, the backup tool supplies the data object for transmission to the cloud destination via a cloud interface. For instance, the backup tool calls a function defined by a cloud API that transmits the data object to the cloud destination. Due to the size of the data object, the backup tool can invoke a function or procedure that breaks apart the data objects and transmits the different pieces of the objects to the cloud destination concurrently, over multiple connections. In other words, the backup tool can decompose the data object and reconstruct the data object at the cloud destination. FIG. 3 depicts control flowing back from block 323 to block 311, but block 311 likely occurs concurrently with the sequence of operations defined by blocks 313, 315, 317, 319, 321, and 323 or a subset of those blocks. Moreover, transmission of the data object to the cloud destination (323) may be an asynchronous, concurrent operation with the other operations of FIG. 3.

When a received data stream element indicates end of stream (block 313), control flows to block 325. At block 325, the backup tool generates a last data object with a remainder of the received data stream elements. For the last data object of an object set, constituent data stream elements may not reach the maximum size of the data object.

At block 327, the backup tool updates the data object counter.

At block 329, the backup tool creates a metadata object for the object set. As a reminder, the object set corresponds to the data set being backed up. The metadata object for the object set at least indicates the number of data objects that form the object set. This inventory information is used when creating the backup image from the data objects. The backup tool names the metadata object with a name that encodes the backup level. Considering the relatively small size of the metadata, the metadata object will be no more than a single object. Additional examples of metadata that can be recorded in the metadata object include the name of the target host, network address of the target host, the data set identifier, and the backup engine running on the target host.

At block 331, the backup tool supplies the metadata object for transmission to the cloud destination via the cloud interface.

At block 333, the backup tool tears down the connections. The backup tool does not necessarily tear down the connections, though. The backup tool can determine whether another backup operation has been requested for a data set that is also hosted on the target host. If so, the backup can maintain the connections for subsequent backup operation targeting a different data set.

FIGS. 4 and 5 depict flowcharts of example operations for restoring a data set from a backup image reconstructed from an object set stored in a cloud. FIG. 4 depicts a flowchart of example operations for obtaining a cloud data container that contains objects of an object set and constructing a backup image from those objects.

At block 401, a backup tool receives an indication of a cloud source, an object set identifier, and a data set identifier. For instance, the backup tool receives input that identifies a hostname or network address of a cloud resource, an object set identifier, and a data set identifier. In some cases, one of the object set identifier and the data set identifier can be used to determine the other. For instance, an object set identifier can be the data set identifier reformatted to be passed as a cloud API function parameter.

At block 402, the backup tool opens a connection with the cloud source.

At block 403, the backup tool requests from the cloud source a data container with the object set identifier. The data container may be identified with the object set identifier or some defined variation of the object set identifier.

At block 405, the backup tool receives the requested data container or contents of the data container. The dashed line from block 403 to block 405 indicates the asynchronous aspect of a request and response.

At block 407, the backup tool set a backup index N to 0.

At block 409, the backup tool determines the data objects and metadata object that correspond to backup level N, which is 0 in this first iteration. This determination is based on the object names, which encode the backup level. A data container, which corresponds to a data set, can have objects of different backup levels as illustrated in FIG. 2. The backup tool can employ a search utility to search the object names in accordance with the predefined object naming scheme. For instance, the backup tool can search up to the first internal delimiter and compare the string after that delimiter to the current control parameter N.

At block 411, the backup tool constructs a backup image with the data objects of backup level N. The backup tool constructs the backup image in accordance with the object sequencing also encoded in the object names.

At block 413, the backup tool passes the backup image to a restore engine.

At block 415, the backup tool determines whether there are any data objects of the data container for backup level N+1. If there are no objects for the next backup level, then the connection to the cloud source is closed at block 417. If there are objects for the next backup level, then the control variable N is incremented and control returns to block 409.

FIG. 5 depicts a flowchart of example operations for retrieving data objects from a cloud data container in accordance with sequential information encoded in the object names.

At block 501, a backup tool receives an indication of a cloud source, an object set identifier, and a data set identifier. For instance, the backup tool receives input or reads a file that identifies a hostname or network address of a cloud resource, an object set identifier, and a data set identifier. In some cases, one of the object set identifier and the data set identifier can be used to determine the other. For instance, an object set identifier can be the data set identifier reformatted to be passed as a cloud API function parameter.

At block 502, the backup tool opens a connection with the cloud source to access a data container identified based on the object set identifier.

At block 503, the backup tool sets a backup index N and a sequence index to 0.

At block 505, the backup tool retrieves from the data container a metadata object corresponding to backup level N. The backup tool determines which metadata object, assuming the data container contains objects for multiple backup levels, indicates a backup level N.

At block 507, the backup tool retrieves from the data container a data object corresponding to backup level N and sequence M. The backup tool determines which data object has an object name that indicates a backup level N and sequence M.

At block 509, the backup tool uses the retrieved data object to begin or continue construction of a backup image. The backup tool constructs the backup image in accordance with the object sequencing by retrieving the objects in accordance with the name encoded sequencing.

At block 511, the backup tool determines whether all of the data objects for backup level N have been retrieved. The backup tool reads the metadata in the metadata object to determine the number of data objects that constitute the object set for backup level N. For example, the backup tool can compare the sequencing index M to the inventory information in the backup level N metadata object. If there are additional data objects to retrieve at the backup level N, then control flows to block 513. If all data objects for backup level N have been retrieved, then control flows to block 515.

At block 513, the sequencing index M is incremented. Control flows back to block 505 from block 513.

At block 515, the backup tool passes the backup image to a restore engine.

At block 517, the backup tool determines whether there are any data objects of the data container for backup level N+1. If there are no objects for the next backup level, then the connection to the cloud source is closed at block 519. If there are objects for the next backup level, then the backup level index N is incremented and the sequencing index is set to 0 at block 521. Control returns to block 505.

Variations

FIG. 1 depicts functional components of the backup tool 101 to aid explaining FIG. 1. A backup tool can be implemented in a variety of manners that divides program responsibility across any number of functions/modules/procedures. Implementation of a backup tool can vary by platform, developer, etc.

FIG. 2 depicts a backup and restoration through the cloud involving different devices. This could be used for migration or duplication of data sets to different machines. But embodiments are not so limited. Restoration can be back to the source of the backed up data set.

The flowcharts are provided to aid in understanding the illustrations and are not to be used to limit scope of the claims. The flowcharts depict example operations that can vary among aspects of the disclosure. Additional operations may be performed; fewer operations may be performed; the operations may be performed in parallel; and the operations may be performed in a different order. For example, the operations corresponding to block 305 can be performed at any time after operations corresponding to block 301 and before operations corresponding to either of blocks 323 and 331. As another example, a backup tool can start listening for a data stream prior to requesting a target host to stream backup data (i.e., block 309 can occur prior to or concurrently with block 307).

Although the example illustrations refer to a metadata object, generation of a metadata object is not necessary. A backup tool can determine whether a last data object has sufficient remaining space to accommodate the metadata for the object set. If so, then the backup tool can record the metadata into a demarcated part of the last data object. The backup tool can also indicate in the name of the data object that the data object also contains metadata for the object set.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

Aspects of this disclosure are described with reference to flowchart illustrations and/or block diagrams. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
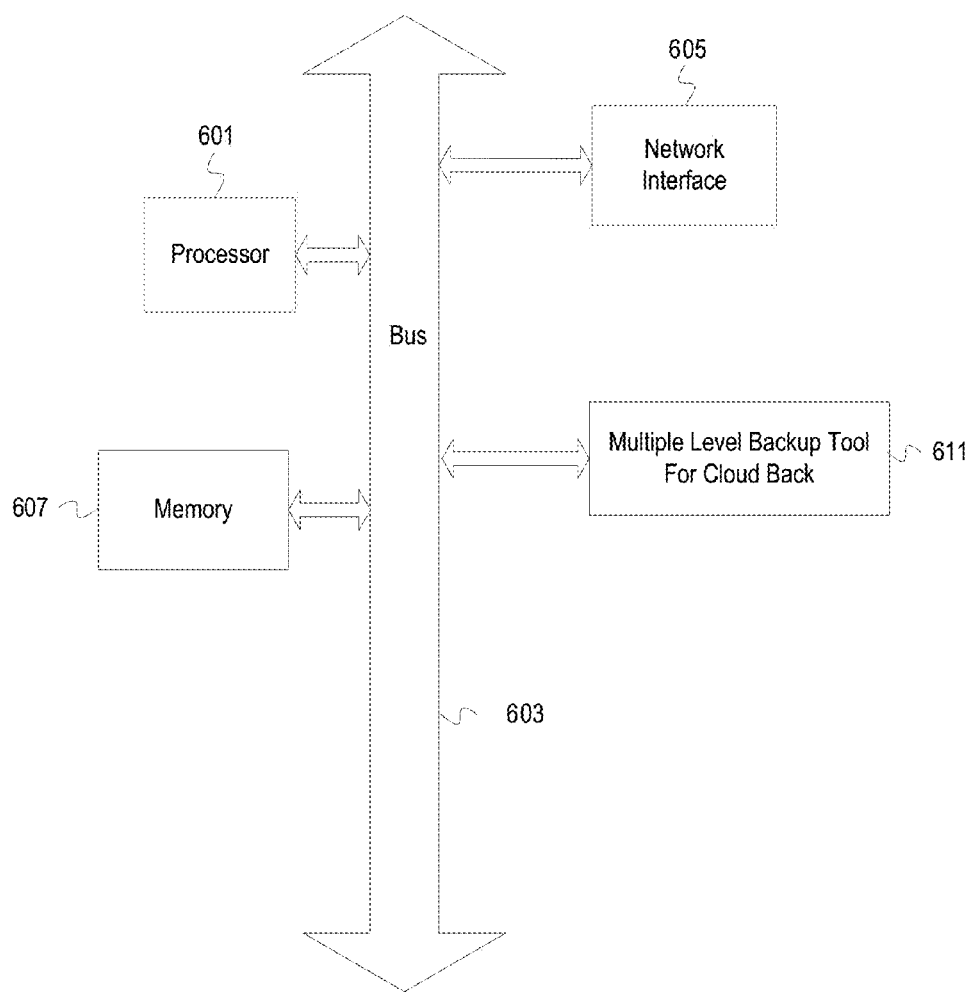
FIG. 6 depicts an example computer system with a backup tool that manages multiple level backup and restoration via a cloud.

FIG. 6 depicts an example computer system with a backup tool that manages multiple level backup and restoration via a cloud. The computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, Hyper-Transport® bus, InfiniBand® bus, NuBus, etc.) and a network interface 1105 (e.g., a Fiber Channel interface, an Ethernet interface, an internet small computer system interface, SONET interface, wireless interface, etc. The system also includes a backup tool 611. The backup tool 611 manages backup of a data set from a source into a cloud across multiple levels of backup. The backup tool 611 also constructs a backup image for restoration of the data set from cloud objects. Any one of the previously described functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601 and the network interface 605 are coupled to the bus 603. Although illustrated as being coupled to the bus 603, the memory 607 may be coupled to the processor unit 601.

While the embodiments of the disclosure are described with reference to various implementations and exploitations, it will be understood that these embodiments are illustrative and that the scope of the claims is not limited to them. In general, techniques for managing multiple level backup and restoration via a cloud as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
    receiving a first data stream for constructing a first backup image at a first backup level for a data set;
    generating a first plurality of data objects from the first data stream, wherein generating the first plurality of data objects comprises,
    indicating, in each of the names of the first plurality of data objects, the first backup level, wherein indication of the first backup level indicates whether the first backup level is a baseline backup level or an incremental backup level,
    for each of the first plurality of data objects, determining a first stream sequencing identifier for the data object that indicates order of the data object with respect to the other data objects in the first plurality of data objects in accordance with serialization of the first data stream and indicating in the name of the data object the first stream sequencing identifier for the data object; and
    storing the first plurality of data objects in a data container hosted in one or more resources of a cloud service provider, wherein an identifier of the data container is based, at least in part, on an identifier of the data set.

2. The method of claim 1 further comprising:
    receiving a second data stream for constructing a second backup image at a second backup level for the data set;
    generating a second plurality of data objects from the second data stream, wherein generating the second plurality of data objects comprises,
    indicating, in each of the names of the second plurality of data objects, the second backup level,
    for each of the second plurality of data objects, determining a second stream sequencing identifier for the data object that indicates order of the data object with respect to the other data objects of the second plurality of data objects in accordance with serialization of the second data stream and indicating in the name of the data object the second stream sequencing identifier for the data object; and
    storing the second plurality of data objects in the data container.

3. The method of claim 2 further comprising:
    obtaining the first and second plurality of data objects from the data container;
    constructing the first backup image from the first plurality of data objects in accordance with the first stream sequencing identifiers and the first backup level indicated in the names of the first plurality of data objects; and
    constructing the second backup image from the second plurality of data objects in accordance with the second stream sequencing identifiers and the second backup level indicated in the names of the second plurality of data objects.

4. The method of claim 3 further comprising passing the first and second backup images to a restore engine.

5. The method of claim 2, wherein the first backup level is a baseline backup level and the second backup level is an incremental backup level.

6. The method of claim 1 further comprising:
    obtaining the first plurality of data objects from the data container; and
    constructing the first backup image from the first plurality of data objects in accordance with the first stream sequencing identifiers and the first backup level indicated in the names of the first plurality of data objects.

7. The method of claim 1 further comprising generating a metadata object that at least includes metadata indicating a number of the first plurality of data objects and storing the metadata object in the data container.

8. The method of claim 7 further comprising indicating in the name of the metadata object the first backup level and that the metadata object includes metadata.

9. The method of claim 1 further comprising requesting that a source of the data set create the first data stream after receiving a request to backup the data set.

10. One or more non-transitory machine-readable media having program code stored therein, the program code comprising program code to:
   generate a first plurality of data objects from a first data stream, the first data stream for constructing a first backup image at a first backup level for a data set, wherein the program code to generate the first plurality of data objects comprises program code to,
   indicate, in each object name of the first plurality of data objects, the first backup level, wherein indication of the first backup level indicates whether the first backup level is a baseline backup level or an incremental backup level,
   for each of the first plurality of data objects, determine a first stream sequencing identifier for the data object that indicates order of the data object with respect to the other data objects in the first plurality of data objects in accordance with serialization of the first data stream and indicate in the name of the data object the first stream sequencing identifier for the data object; and
   store the first plurality of data objects in a remote data container, wherein an identifier of the data container is based, at least in part, on an identifier of the data set.

11. The non-transitory machine-readable media of claim 10, wherein the program code further comprises program code to:
   generate a second plurality of data objects from a second data stream, the second data stream for constructing a second backup image at a second backup level for the data set, wherein the program code to generate the second plurality of data objects comprises program code to
   indicate, in each name of the second plurality of data objects, the second backup level,
   for each of the second plurality of data objects, determine a second stream sequencing identifier for the data object that indicates order of the data object with respect to the other data objects of the second plurality of data objects in accordance with serialization of the second data stream and indicate in the name of the data object the second stream sequencing identifier for the data object; and
   store the second plurality of data objects in the data container.

12. The non-transitory machine-readable media of claim 11 further having program code to:
   obtain the first and second plurality of data objects from the data container after restore of the data set is requested;
   construct the first backup image from the first plurality of data objects in accordance with the first stream sequencing identifiers and the first backup level indicated in the names of the first plurality of data objects; and
   construct the second backup image from the second plurality of data objects in accordance with the second stream sequencing identifiers and the second backup level indicated in the names of the second plurality of data objects.

13. The non-transitory machine-readable media of claim 12 further having program code to pass the first and second backup images to a restore engine.

14. The non-transitory machine-readable media of claim 11, wherein the first backup level is a baseline backup level and the second backup level is an incremental backup level.

15. The non-transitory machine-readable media of claim 10 further having program code to:
   obtain the first plurality of data objects from the data container; and
   construct the first backup image from the first plurality of data objects in accordance with the first stream sequencing identifiers and the first backup level indicated in the names of the first plurality of data objects.

16. The non-transitory machine-readable media of claim 10 further having program code to generate a metadata object that at least includes metadata indicating a number of the first plurality of data objects and to store the metadata object in the data container.

17. The non-transitory machine-readable media of claim 16 further having program code to indicate in the name of the metadata object the first backup level and that the metadata object includes metadata.

18. An apparatus comprising:
   a processor;
   a network interface; and
   a machine-readable medium having program code executable by the processor to cause the apparatus to,
   generate a first plurality of data objects from a first data stream received via the network interface, the first data stream for constructing a first backup image at a first backup level for a data set, wherein the program code to generate the first plurality of data objects comprises program code to,
   indicate, in each object name of the first plurality of data objects, the first backup level, wherein indication of the first backup level indicates whether the first backup level is a baseline backup level or an incremental backup level,
   for each of the first plurality of data objects, determine a first stream sequencing identifier for the data object that indicates order of the data object with respect to the other data objects in the first plurality of data objects in accordance with serialization of the first data stream and indicate in the name of the data object the first stream sequencing identifier for the data object; and
   store the first plurality of data objects in a remote data container, wherein an identifier of the data container is based, at least in part, on an identifier of the data set.

19. The apparatus of claim 18, wherein the machine-readable medium further has program code executable by the processor to cause the apparatus to:
   generate a second plurality of data objects from a second data stream, the second data stream for constructing a second backup image at a second backup level for the data set, wherein the program code to generate the second plurality of data objects comprises program code to
   indicate, in each name of the second plurality of data objects, the second backup level,
   for each of the second plurality of data objects, determine a second stream sequencing identifier for the data object that indicates order of the data object with respect to the other data objects of the second plurality of data objects in accordance with serialization of the second data stream and indicate in the name of the data object the second stream sequencing identifier for the data object; and store the second plurality of data objects in the data container.

20. The apparatus of claim 19, wherein the machine-readable medium further has program code to:

obtain the first and second plurality of data objects from the data container after restore of the data set is requested;

construct the first backup image from the first plurality of data objects in accordance with the first stream sequencing identifiers and the first backup level indicated in the names of the first plurality of data objects; and construct the second backup image from the second plurality of data objects in accordance with the second stream sequencing identifiers and the second backup level indicated in the names of the second plurality of data objects.

\* \* \* \* \*